United States Patent [19]

Crissy et al.

[11] Patent Number: 4,553,888

[45] Date of Patent: Nov. 19, 1985

[54] CAPTIVE DUNNAGE FITTING

[75] Inventors: Charles F. Crissy; Paul M. Holmes, both of Jackson, Mich.

[73] Assignee: Aeroquip Corporation, Jackson, Mich.

[21] Appl. No.: 507,037

[22] Filed: Jun. 23, 1983

[51] Int. Cl.4 .................. B61D 45/00; B63B 25/24
[52] U.S. Cl. .................... 410/144; 410/152; 403/325; 403/327
[58] Field of Search ............... 410/94, 95, 104, 105, 410/121, 126, 129, 130, 143, 150, 151, 152, 148, 410/146, 132, 137, 138, 139, 142, 144, 145, 147, 149, 410/153, 211/192, 207, 208; 403/255, 325, 327, 330; 105/373, 374; 248/503.1, 500, 499

[56] References Cited

U.S. PATENT DOCUMENTS

| | | | |
|---|---|---|---|
| 2,576,425 | 11/1951 | Thearle | 410/146 |
| 2,891,490 | 6/1957 | Elsner | 410/105 |
| 3,017,841 | 1/1962 | Miller | 410/146 |

OTHER PUBLICATIONS

Publication of International Patent WO81/01818, 7/9/1981, Kirby et al.

Primary Examiner—Robert B. Reeves
Assistant Examiner—Dennis C. Rodgers
Attorney, Agent, or Firm—Beaman & Beaman

[57] ABSTRACT

A dunnage bar system for freight containers utilizing a fixed elongated track cooperable with fittings mounted upon the opposite ends of an elongated bar. The bar fittings including a head captive within the associated track affixed to a neck extending through an elongated slot wherein the fitting may be adjusted along the track length and openings formed in the track selectively cooperate with head projections to lock the fitting against longitudinal track displacement. The dunnage bar fittings are releasable from the track openings by a rotative movement of the head either with, or relative to the bar, and with a relatively movable head a latch is associated therewith locking the fitting head relative to its bar.

13 Claims, 14 Drawing Figures

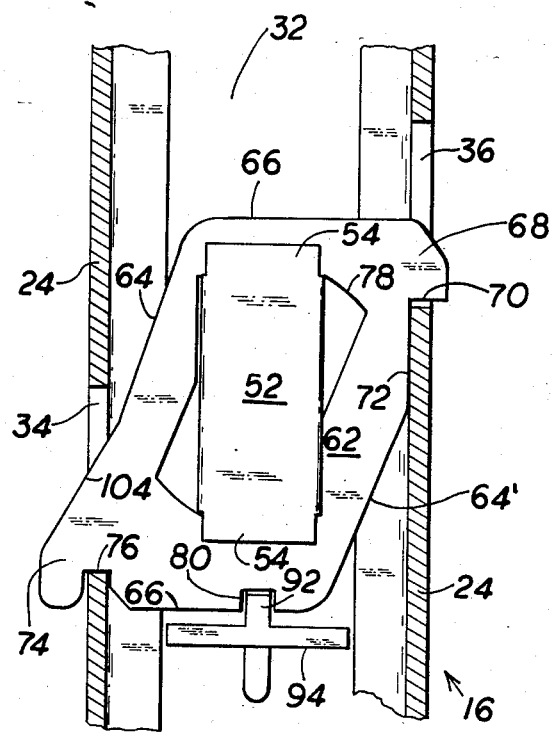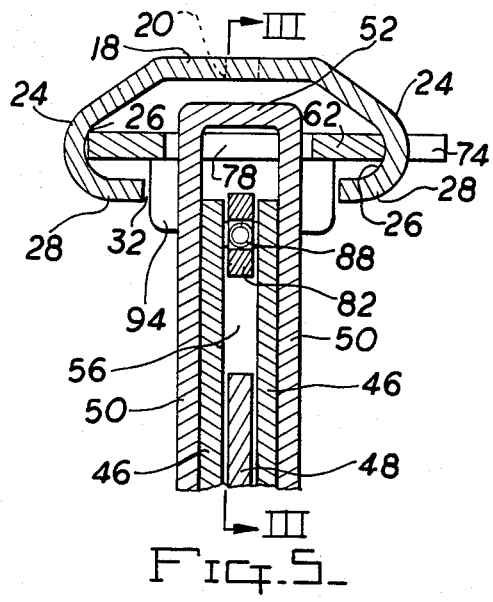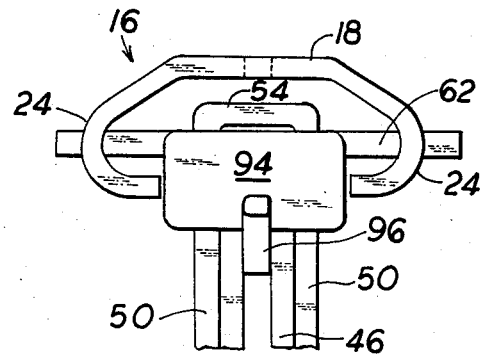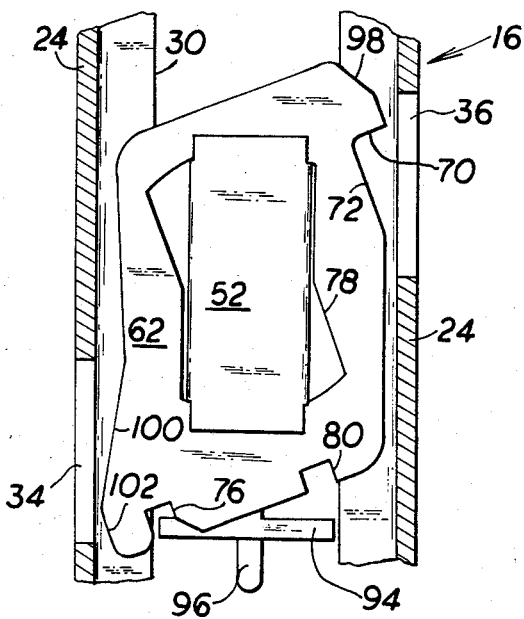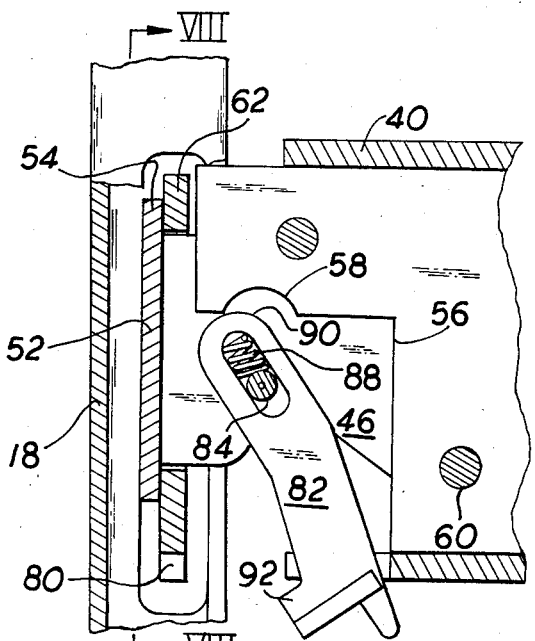

CAPTIVE DUNNAGE FITTING

BACKGROUND OF THE INVENTION

Dunnage bars are commonly employed in rail cars, semitrailers, ship holds, freight containers and the like to prevent the shifting of freight and to serve as supports for elevated floors. Such dunnage bars commonly consist of an elongated bar element having end fittings cooperating with elongated fixed tracks attached to the walls of the freight transporting vehicle. A variety of type of fittings are used to connect the bar to the tracks and a variety of locks are employed for releasably connecting the fittings to the tracks permitting adjustment of the bars relative to the track and preventing accidental release therefrom.

However, most dunnage bar fittings are fully releasable from the associated track permitting the bar to be removed from complete association with the track, and as the requirements and usage of dunnage bars varies with each freight load the dunnage bars are often removed from the vehicle or stored in such a location as to be damaged, or inadvertently or purposely discarded. As a dunnage bar, and its associated fittings is a relatively expensive apparatus the loss or damage of the bar imposes high costs upon the vehicle owner or shipper responsible for the dunnage equipment, and there has been a need for dunnage bars capable of versatile adjustment within its tracks but which cannot be lost or discarded.

It is an object of the invention to provide a dunnage bar system wherein the bar is "captive" with respect to its associated track and cannot be removed from the track, but is longitudinally adjustable thereto.

A further object of the invention is to provide a captive dunnage bar system utilizing a bar having end fittings associated with a fixed elongated track wherein the end fittings are locked within the track, but are selectively adjustable therein between predetermined locations.

Another object of the invention is to provide a captive dunnage bar system utilizing a track having spaced opposed parallel sides having openings formed therein, and defining an elongated slot of lesser dimension than the spacing between the track sides, the dunnage bar having a fitting head within the track attached to a neck extending through the slot wherein the fitting head cannot be removed through the slot and the head includes projections selectively cooperating with track openings to lock the bar fitting at predetermined locations on the track.

A further object of the invention is to provide a captive dunnage bar system utilizing dunnage bar fittings captive within an elongated track wherein rotational adjustment of the fitting relative to the track locks and releases the fitting relative to the track.

Another object of the invention is to provide a captive dunnage bar system utilizing a dunnage bar head captive within a track, the head being rotatively mounted upon a bar neck extending through a track slot, and a latch associated with the fitting head controlling the rotational position of the head to the neck.

An additional object of the invention is to provide an elongated track for a captive dunnage bar system wherein the track may be incorporated into freight vehicle walls and may serve as a structural member of the vehicle.

The configuration of the elongated track used with the dunnage bar system of the invention may take a variety of forms, but the bar must include parallel spaced opposed portions in which openings are defined. The openings within opposed portions are misaligned with respect to the track length, and the track defines a slot extending the track length which is of lesser dimension in width than the spacing between the track portions in which the openings are defined.

The dunnage bar includes fittings at each end, and the fittings include a neck extending in the direction of the bar length having an outer end upon which fitting head structure is associated. In one embodiment of the invention the fitting head is fixed relative to the bar, while in another embodiment the fitting head is rotatably associated with the bar neck.

In the embodiment wherein the fitting head is fixed relative to the bar the head is defined by flange portions lying within a plane perpendicular to the bar length extending from neck portions which project through the track slot. The fitting head includes projections capable of being received within the track openings at one rotational attitude of the bar relative to the bar length. By rotating the bar, the rotational attitude of the fitting head relative to the track changes permitting the head projections to withdraw from the track openings and permitting the fittings, and bar, to be longitudinally adjusted relative to the track.

In another embodiment of the invention, the fitting head is rotatably mounted upon the bar neck, and includes projections selectively cooperable with the track openings at a first rotational position upon the neck. At a second rotational position the fitting head projections are released from the track openings and adjustment of the fitting, and bar, relative to the track is readily accomplished. A manually operated latch formed upon the fitting neck cooperates with the head when the head is in the operative position preventing inadvertent rotation of the fitting head which would release the fitting from the desired location relative to the track.

A variety of track configurations may be used in the practice of the invention, the various configurations are illustrated wherein the track may be incorporated into the walls of the cargo space, and may serve as structural members. The track elements may include means for cooperating with the cargo space walls and such "built-in" track forms eliminate the likelihood of track damage while providing an attractive appearance within the cargo space.

BRIEF DESCRIPTION OF THE DRAWINGS

The aforementioned objects and advantages of the invention will be appreciated from the following description and accompanying drawings wherein:

FIG. 4 is an enlarged, detail, end, elevational view of the end fitting as taken along Section IV—IV of FIG. 3, FIG. 5 is an enlarged plan, detail, sectional view as taken along Section V—V of FIG. 2, FIG. 6 is a bottom view of the fitting as taken along Section VI—VI of FIG. 2, FIG. 7 is a view similar to FIG. 3 illustrating the latch in the release position, FIG. 8 is an end view of the fitting head illustrating the head in the released and adjustable position as taken along Section VIII—VIII of FIG. 7.

DESCRIPTION OF THE PREFERRED EMBODIMENTS

Figure 1:
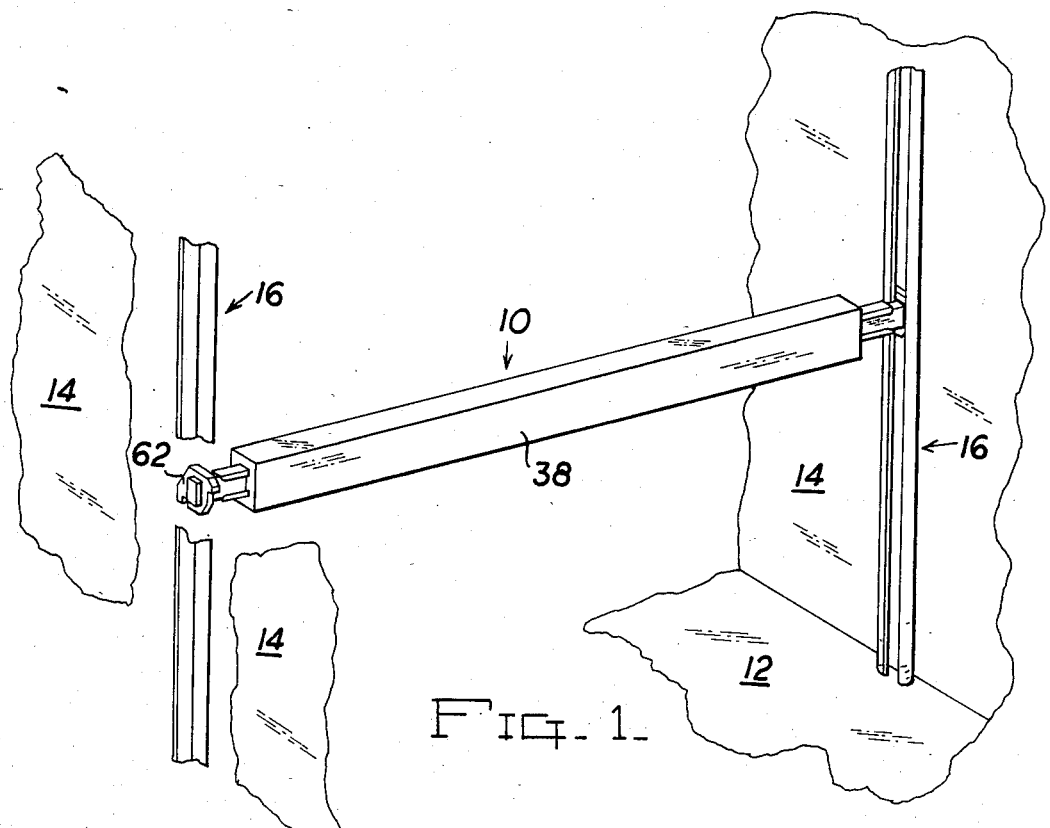
FIG. 1 is a perspective view illustrating a typical installation of a dunnage bar system in accord with the invention.

In FIG. 1 a typical dunnage installation utilizing the invention is disclosed in a general manner. The cargo space in which the dunnage bar 10 is to be used includes a floor represented at 12, and spaced walls as represented at 14. This space may exist within a rail car, a truck trailer, van, ship hold, freight container, or the like. Identical parallel tracks 16 are mounted upon opposite walls of the freight holding space, and the tracks may be surface mounted, as illustrated, or flush mounted, as later described. The bar 10 extends across the freight holding space between the walls, and serves to confine the freight against shifting in a direction transverse to the bar length, or the dunnage bar may be used to support elevated flooring or shelving, not shown, to define elevated storage space above floor 12.

The track illustrated in FIGS. 1-8 has a configuration best appreciated from FIGS. 4 and 5. The track is preferably formed of rolled steel having a flat central region 18 in which holes 20 are defined for receiving mounting screws 22 for attaching the track to the supporting wall 14. The track includes lateral side portions 24 which are in opposed parallel relationship to each other, the maximum internal dimension being defined between opposed concave surfaces 26, FIG. 5. The sides 24 extend toward each other at 28 terminating in parallel edges 30 defining a slot 32 of lesser width than the dimension between the surfaces 26 of the sides.

Openings 34 and 36 are defined in the sides 24 of the track, these openings being of an elongated nature, FIG. 4, and the openings defined in the sides are axially offset with respect to each other as will be appreciated from FIG. 4. A track constructed as aforedescribed is economically manufactured, rugged, of a high strength, and resistant to damage.

The dunnage bar 10, in its simplest form, consists of an elongated central member 38 which may be formed of wood or metal, or a combination thereof. As the bar disclosed is of the "captive" type, it is not necessary that the bar be longitudinally adjustable or have telescoping components as is often the case with conventional dunnage and bracing bar systems.

Each end the bar 10 includes a plurality of metal components bolted to the portion 38 and extending from the ends thereof. These components include an upper cap 40, a lower cap 42, FIG. 2, a U-shaped neck 44, a pair of spaced plates 46 and a central plate 48. The neck includes parallel leg portions 50 and a base portion 52 having flanges 54 extending beyond the edges of the legs, FIG. 3. The internal plates 46 terminate short of the base 52, as does the central plate 48, and the central plate is recessed at its lower edge, FIG. 7, providing a cavity 56 having a concave notch 58 formed therein for a purpose later described. The legs 50 are of the configuration apparent in FIG. 2 and are fastened to the plates 46 and central plate 48 by rivets or bolts 60 wherein the neck is integrally affixed to the bar portion 38.

A fitting head 62 of a planar plate configuration is mounted upon the neck 44. The head 62 is of a generally quadrangular configuration, FIGS. 4 and 8, having a width defined by sides 64 and a length defined by parallel end edges 66. A projection 68 is defined upon the head forming abutment surfaces 70 and 72, and a hook projection 74 is defined upon the opposite side of the fitting head defining a notch 76. Internally, the head 62 is formed with an opening 78 permitting the head to be mounted upon the neck legs 50 and rotatable thereto. The configuration of the head opening 78 will be appreciated from FIG. 4 wherein a limited rotation of about 20° is possible. It is to be noted that the dimension of the head opening 78 with respect to the length of the base 52 is less than the length of the neck base as defined by flanges 54, and in this manner when the neck is assembled to the bar plates 46 the head 62 is retained upon the neck legs, and is rotatable thereto through a limited degree of rotation as will be apparent from the following description.

The head 62 is provided with a notch 80 which cooperates with a locking lever 82, FIG. 7, when the head is in the operative position. The locking lever 82 is pivotally mounted upon a pivot pin 84 extending through plates 46, and the lever is provided with an elongated slot 86 which includes spring 88 which biases the lever upwardly, FIG. 3. The lever is provided with a convex end surface 90 complementary in radius to the central plate notch 58 and the locking lever includes a detent portion 92, a locking plate 94 at right angles to the main body portion of the lever, and a stop tang 96. Thus, it will be appreciated that the locking lever 82 can be moved downwardly, FIGS. 3 and 7, against the tension of the spring 88, and may be pivoted between the operative position of FIG. 3, and the inoperative position of FIG. 7 once the lever has been moved downwardly sufficiently to clear the end 90 from the notch 58.

Each end of the bracing bar portion 38 is provided with an end fitting identical to that described above. As will be appreciated from the drawings, the width of the fitting head 62 as defined by sides 64 is greater than the width of the slot 32 as defined by track edges 30, but the width of the head is less than the maximum width of the track as defined by the spacing between the surfaces 26. Accordingly, when initially assembled the bar necks 44 extend into the tracks through the slots 32 and the heads 62 will be located within the confines of the track. As the plane of the fitting heads 62 is perpendicular to the length of the bar portion 38 the bar is "captive" with respect to its tracks and cannot be removed therefrom, although the bar may be adjusted in the direction of the track lengths when the locking lever detent 92 is not received within the head notch 80, such as in FIG. 8. In this position the head 62 will be rotated relative to the neck 44 as illustrated in FIG. 8 and the head is readilly slidable within the track and the neck within the slot 32. To facilitate such adjustment the operator will push the bar in the direction which forces the head surface 64' against its adjacent track surfaces 26, FIG. 8, which will maintain the head in an alignment which prevents the projections 68 and 74 from entering the track openings 36 and 34, respectively. When moving the bar upwardly, FIG. 8, the head cam surfaces 98 and 100 may engage the edges of the adjacent openings, but such engagement will tend to pivot the head in the counterclockwise direction further preventing the projections from entering the track openings. When the bar is moved downwardly, FIG. 8, inadvertent engagement of the head projections with the openings can again be prevented by maintaining engagement of the head edge 64' with the adjacent track surface 26, and the cam surface 102 defined upon the head aids in preventing hook projection 76 from entering an opening 34 if the head is not moved too far to the left, FIG. 8. Accordingly, the bar 10 may be readily adjusted within both tracks 16 simultaneously in either direction.

When it is desired to lock the dunnage bar in its operative position the operator will pull the bracing bar in a direction to the left, FIGS. 4 and 8, and simultaneously lower the bar. Such action permits the hook projection 74 to enter an opening 34 engaging the opening lower edge causing the head to pivot in a clockwise direction, FIG. 4, thrusting projection 68 into opening 36, and further inserting the hook projection into the opening 34 so that the notch 76 will fully engage the track opening edge as apparent in FIG. 4. When fully associated with the track opening the fitting head 62 will be in the position shown in FIG. 4 wherein abutment surfaces 70 and 72 are in engagement with the track and the notch 80 is in alignment with the locking lever 82. The locking lever 82 is then pivoted to the locked position of FIG. 3 permitting detent portion 92 to enter the notch 80 which prevents rotation of the head 62 upon the neck 44, and locking plate 94 enters slot 32 to prevent rotation of the bar 38 relative to the track. In this condition the dunnage bar 10 is locked in its operative position and capable of transmitting high downward forces on the tracks 16 through the heads 62.

Figures 2, 3:
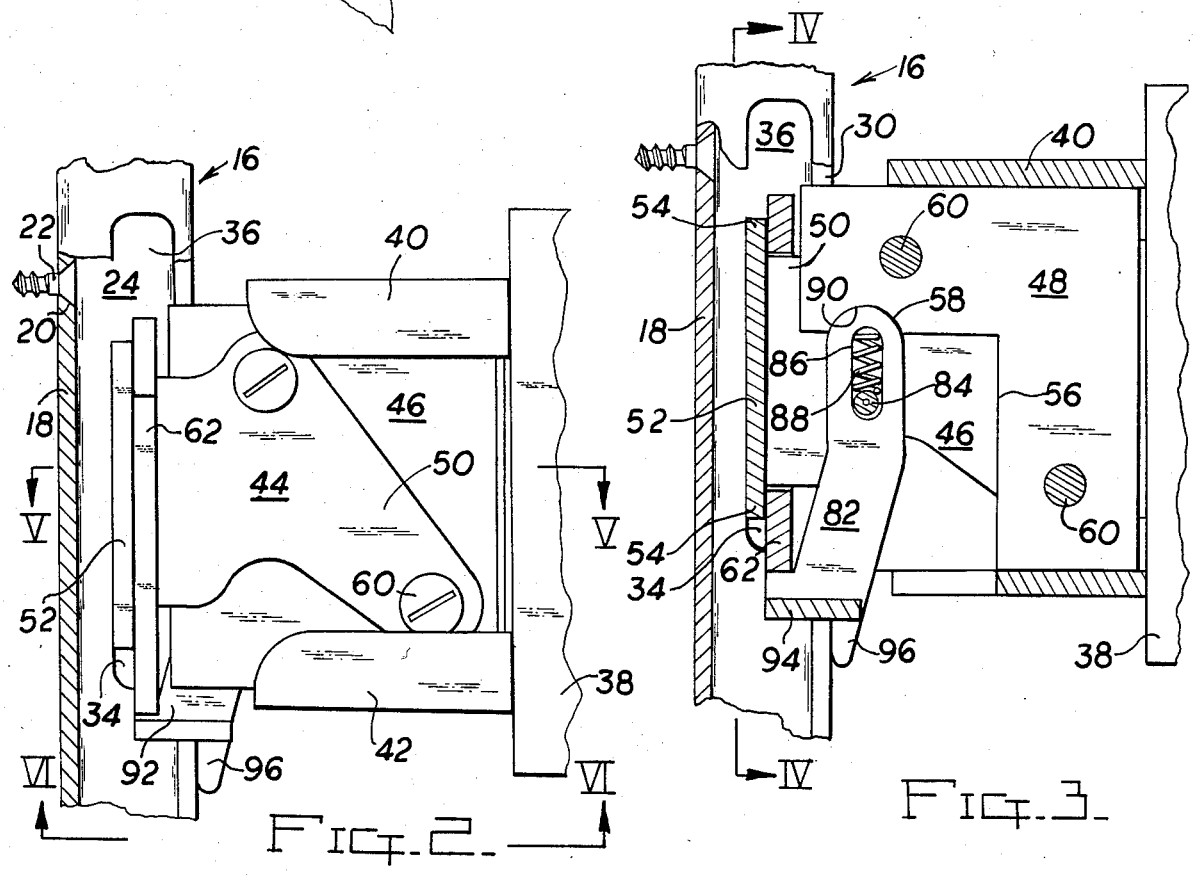
FIG. 2 is an enlarged, elevational, sectional view of the bar end fitting.
FIG. 3 is an enlarged, detail, sectional, elevational view of the bar end fitting as taken along Section III—III of FIG. 5.

With the head 62 locked in the position of FIGS. 3 and 4, upward movement of the bar within the track causes the upper edge of the opening 34 to engage the head surface 104, but the head cannot rotate relative to the neck due to the engagement of the locking lever 82 with notch 80 and such upper displacement of the bar is prevented. However, if the operator grasps the locking lever handle 96 and pulls the lever downwardly to clear end 90 from notch 58 and pivots the lever to the position of FIG. 7 such upper movement of the head 62 to engage surface 104 with the upper edge of notch 34 will cause the head to pivot in a counterclockwise direction, as will the engagement of the upper edge of opening 36 with head cam surface 98 again pivoting the head to the position of FIG. 8 permitting adjustment of the bar relative to the track.

When not in use, the bar 10 may be easily lifted within its tracks 16 to its uppermost position wherein the bar will be overhead with respect to the floor 12 permitting traffic therebelow, and lift trucks and other load handling equipment may readily pass below the bar, and the bar may easily be maintained in such an elevated nonuse position. However, the bar cannot be removed from association with its tracks.

Figure 10:
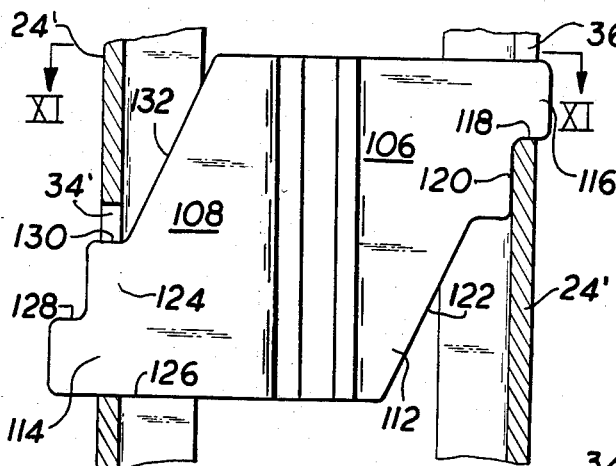
FIG. 10 is an end elevational, detail, sectional view of the fitting of FIG. 11 as taken along Section X—X thereof.
Figure 9:
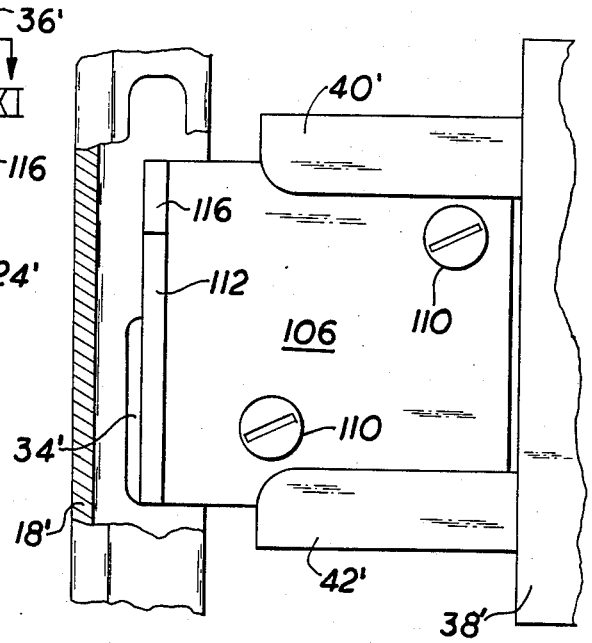
FIG. 9 is an enlarged, detail, elevational, sectional view of another embodiment of dunnage bar fittings in accord with the invention, partially sectioned.
Figure 11:
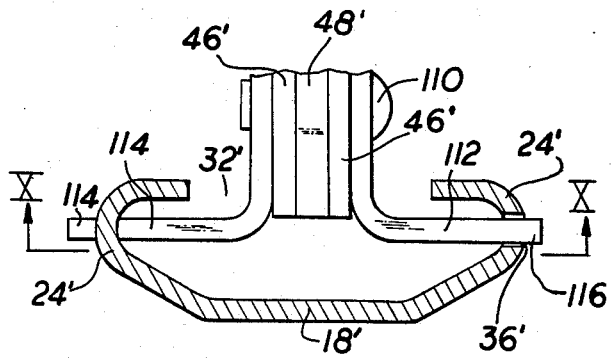
FIG. 11 is a plan, sectional view as taken along Section XI—XI of FIG. 10, the upper cap not being shown.

The embodiment of FIGS. 9-11 utilizes many of the same components previously described and identical components are indicated by primed reference numerals. In this embodiment the head fitting is formed by a pair of L-shaped elements 106 and 108 bolted to the bar plates 46' at 110. These elements each include a flange 112 and 114, and the flange 112 includes a projection 116, abutment surfaces 118 and 120 and an oblique side surface 122. The flange 114 includes a projection 124 and abutment surfaces 126, 128 and 130, and oblique side surface 132.

When using the embodiment of FIGS. 9-11, the bracing bar portion 38' is manually rotated in a counterclockwise direction, FIG. 10, and such movement will withdraw projection 116 from opening 36' and projection 124 from opening 34' causing the head surfaces 122 and 132 to be substantially parallel to the sides of the track, and in this orientation the bar may be readily adjusted in the longitudinal direction of the tracks.

When it is desired to lock the bar to the track, the bar is rotated in a clockwise direction and upon alignment of the projections 116 and 124 with openings 36' and 34', respectively, the projectiions will enter the associated opening forming the relationship shown in FIG. 10. In such a relationship vertical downwardly directed forces on the bar portion 38' are directly transmitted to the track and the engagement of the fitting head surfaces with the track prevent rotation of the head in a clockwise direction effectively locking the bar against further downward movement. However, with this embodiment, inadvertent upward movement of the bar may cause the head fitting to rotate counterclockwise to sufficiently disengage the head projections with their opening. The surface 130 will engage the upper edge of opening 34' upon upward movement of the fitting, and minimize inadvertent disengagement of the fitting head from the openings, but in this embodiment a positive lock against inadvertent release is not assured as is the case with the aforedescribed embodiment. If desired, a locking lever similar to 82 can be pivotally mounted between elements 106 and 108 having a locking plate similar to 94 for reception in the track slot to prevent bar rotation.

Figure 12:
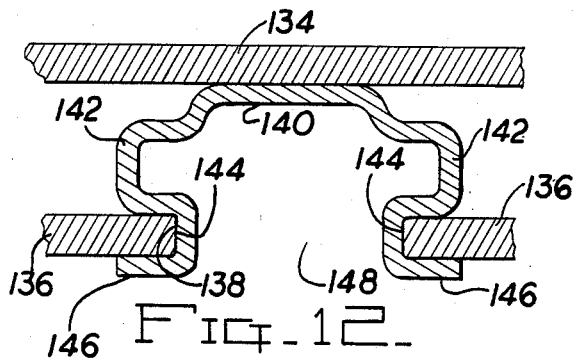
FIGS. 12-14 are detail, plan, sectional views of variations of track configurations in accord with the invention.
Figure 13:
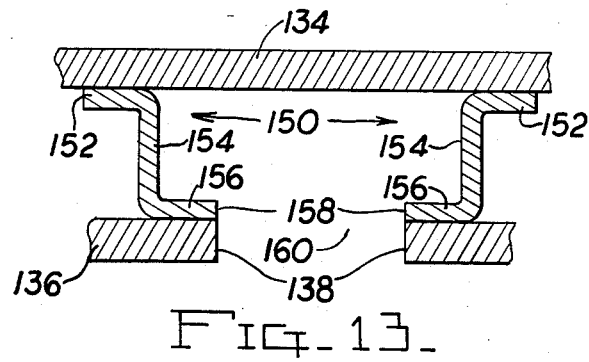
Figure 14:
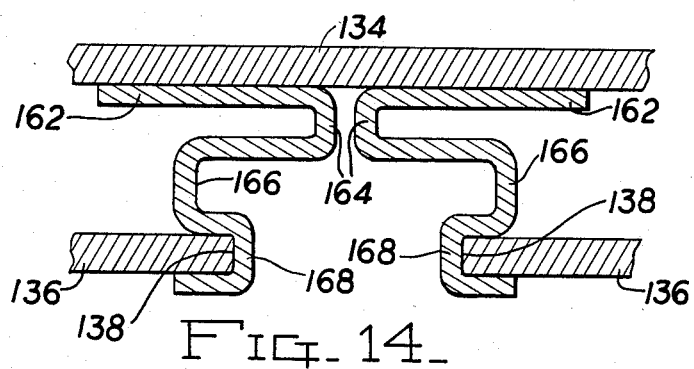

FIGS. 12-14 illustrate variations in track structure with which the fitting of the invention may be employed. As will be appreciated, it is necessary that the track have parallel opposed side portions in which the fitting head projection receiving openings are defined, and also, the track must define an elongated slot parallel to the track length which is of a lesser width than the track sides in which the openings are defined insuring that the fitting head will be held captive within the track.

In these figures reference 134 represents the primary support wall of the cargo space, and may constitute the exterior wall of a trailer or freight container. In these disclosed track embodiments the freight space is defined by inner panels 136 defining an inner wall, the adjacent panel being spaced from each other and being defined by parallel edges 138.

In FIG. 12 the track consists of a single element as with the previously described track embodiment, and includes a base portion 140 in which holes are defined whereby fasteners are used to attach the track to the wall 134. The track is shaped, usually by rolling, to define parallel spaced sides 142 in which openings are formed relatively axially spaced in the manner apparent from FIGS. 4 and 10. The edge portions of the track are then formed in a U-configuration to define notches 144 which closely receive the edges of the inner panels 136. Openings are preferably defined in the leg portions 146 for receiving fasteners for attaching the panels to the track. As appreciated from FIG. 12, the slot 148 is of lesser width than the dimensions separating the sides 142.

In FIG. 13 the track consists of a pair of "Z" members 150 each including a flange 152 having openings defined therein for attachment to the wall 134 by fasteners. The intermediate side portions 154 are in spaced parallel relationship having openings defined therein for receiving the fitting head projections, the openings being spaced as aforedescribed. The inwardly extending flanges 156 are provided with openings whereby fasteners attach the inner panels 136 to the flanges 156, and the flange ends 158 will define the slot 160 through which the fitting head extends. In this embodiment the track is not visible as only the slots defined by the panel ends 138 are exposed.

In the embodiment of FIG. 14 a pair of identical elements each include mounting flanges 162 having holes permitting attachment to the wall 134. Portions 164 may be varied in dimension wherein this type of track can be used to accommodate situations where considerable thickness occurs between the wall 134 and the panels 136. The sides 166 define the fitting head projection receiving openings, and the U-shaped portions 168 define notches receiving the ends of the inner panels.

In all of the aforedescribed track configurations, the tracks may serve as the structural components for the freight confining space, such as columns within a trailer van for supporting the roof, or the like.

From the above description it will be appreciated that a captive dunnage bar is illustrated of economical construction which is positive in operation, easy to use, and resistant to damage, yet capable of bearing high loads. Modifications to the inventive concepts may be apparent to those skilled in the art without departing from the spirit and scope of the invention.

We claim:

1. A captive dunnage bar system comprising, in combination, a fixed track having spaced, parallel, opposed, elongated first and second sides, said sides including portions defining an elongated slot therebetween of lesser width that the spacing between said sides, first openings defining in said first side and second openings defined in said second side, one of said first openings defining a set with one of said second openings, said openings of a set being longitudinally spaced from each other in the direction of the track length in an unopposed relationship, a fitting extending into said track through said slot having a head located between said track sides, said head having a length and sides defining a width less than the spacing between said track sides permitting said head to be partially rotated within said track about an axis perpendicular to the track length and greater than than the track slot width whereby said head is retained within said track, a first projection extending from one of said head sides and a second projections extending from the other head side, said head projections being offset with respect to each other relative to the head length a distance equal to a track opening set longitudinal spacing and of a length defining a dimension less then the spacing between said track sides when said head is rotated about its axis whereby said projections are received within track openings defining a set at a first head rotative orientation to said track and are removed from said track openings defining a set at a second head rotative orientation to said track permitting longitudinal adjustment of said fitting along said track.

2. In a captive dunnage bar system as in claim 1 wherein said head length is greater than the spacing between said track sides wherein said head sides engage said track sides upon said head being rotated to said second rotative orientation limiting rotation of said head.

3. In a captive dunnage bar system as in claim 2, said fitting including a neck extending through said track slot having a width less than the track slot width, said head being mounted upon said neck.

4. In a captive dunnage bar system as in claim 3, said head being ridgly fixed upon said neck.

5. In a captive dunnage bar system as in claim 3, said head being pivotally mounted upon said neck for rotation between said head first and second rotative orientations.

6. In a captive dunnage bar system as in claim 5, locking means defined upon said neck releasably locking said head in said first rotative orientation.

7. In a captive dunnage bar system as in claim 6, said locking means including a notch defined in said head, a lever pivotally mounted upon said neck having a first position engaging said notch locking said head in said first rotative orientation and a second position releasing said lever from said notch, and releasable spring biased detent means defined on said neck maintaining said lever in said first position.

8. In a captive dunnage bar system as in claim 1, one of said head projections including a notch receiving the track material at the associated opening at said head first rotative orientation.

9. A captive dunnage bar fitting for use with an elongated fixed track having parallel spaced sides having openings defined therein and an elongated slot intermediate the sides of a width less than the spacing between the sides, the openings of the sides being offset relative to each other with respect to the track length, comprising, in combination, a neck adapted to be received within the track slot, a head mounted upon said neck for pivotal movement thereon about an axis substantially perpendicular to the track length, said head having lateral sides defining a width less than the spacing between the track sides whereby said head may pivot upon said neck about its axis between first and second positions, and a width greater than the lot width and track engagable projections extending from said head sides for selective engagement with track openings.

10. In a captive dunnage bar fitting as in claim 9 said neck comprising a U-shaped element having legs interconnected by a base, extensions defining in said base transversely related to the length of said legs, said head having an opening receiving said legs and engaging said extensions, said head opening permitting pivoting of said head upon said legs.

11. In a captive dunnage bar fitting as in claim 9, releasable head locking means defined upon said neck selectively cooperating with said head to prevent rotative head movement from said first position to said second position.

12. In a captive dunnage bar fitting as in claim 11, said locking means including a notch defined in said head, a lever pivotally mounted upon said neck selectively received within said notch, and a locking plate defined upon said lever selectively positioned within the track slot to prevent bar rotation.

13. A dunnage fitting track comprising in combination, a pair of spaced elongated metal elements depending from a planar mounting portion and an opening receiving portiion defined on each element transversely disposed to the associated mounting portion, said elements' opening receiving portions being in parallel, spaced, opposed relation to each other, an elongated slot defined between said opening receiving portions parallel to the length of said elements having a width less than the spacing between said opening receiving portions, an elongated panel receiving groove defined in each of said element adjacent said slot, a plurality of openings defined in each of said elements' opening receiving portions, the openings within each portion being spaced from each other along the length of the associated portion and located intermediate said mounting portion and said slot with respect to the transverse sectional dimension of said track, the openings within one opening receiving portion being offset in the direction of the track length with respect to the openings within the opposed opening receiving portion and the openings within opposed opening receiving portions being open toward each other, the offset relationship between two adjacent openings in opposed portions being uniform wherein said two openings constitute a set for receiving a fitting inserted through said slot.

* * * * *